United States Patent [19]

Koch

[11] Patent Number: 4,672,655

[45] Date of Patent: Jun. 9, 1987

[54] METHOD FOR ESTABLISHING A CONNECTION WITH A MOBILE SUBSCRIBER AND SYSTEM FOR IMPLEMENTING THE METHOD

[75] Inventor: Harry Koch, Burgwedel, Fed. Rep. of Germany

[73] Assignee: ANT Nachrichtentechnik GmbH, Backnang, Fed. Rep. of Germany

[21] Appl. No.: 680,082

[22] Filed: Dec. 10, 1984

[30] Foreign Application Priority Data

Dec. 8, 1983 [DE] Fed. Rep. of Germany ....... 3344961

[51] Int. Cl.⁴ .............................................. H04M 11/00
[52] U.S. Cl. ............................................. 379/57; 379/58; 4/12; 4/13
[58] Field of Search ................. 179/2 E, 2 EA, 2 EB, 179/2 EC, 18 BF; 455/12, 13

[56] References Cited

U.S. PATENT DOCUMENTS

| | | | |
|---|---|---|---|
| 3,902,022 | 8/1975 | Breeden et al. | 179/2 EC |
| 4,172,969 | 10/1979 | Levine et al. | 179/2 EC |
| 4,178,476 | 12/1979 | Frost . | |
| 4,197,526 | 4/1980 | Levine et al. | 340/311 |
| 4,263,480 | 4/1981 | Levine | 179/2 EC |
| 4,313,035 | 1/1982 | Jordan et al. | 179/18 BE |
| 4,336,524 | 6/1982 | Levine et al. | 340/311.1 |
| 4,455,651 | 6/1984 | Baran | 370/104 |
| 4,577,060 | 3/1986 | Webb | 179/2 EC |

OTHER PUBLICATIONS

R. E. Anderson et al., "Satelline-Aided Mobile Telephone System", Proc. of the Nat. Electro. Conf., vol. 33 (1979) pp. 432-437.
T. Freygard, "Feasibility of International Transport Communications System", IEEE International Conference on Communications, IEEE Catalog No. 82CH1766-5, Conference Record, vol. 3 of 3, (1982) pp. 7H.4.1-7H.4.6.

Primary Examiner—Robert Lev
Attorney, Agent, or Firm—Spencer & Frank

[57] ABSTRACT

To establish a connection between a stationary subscriber connected to a telephone system and a mobile subscriber, call signals are transmitted via a call center, an earth radio station and a satellite to a plurality of transceivers distributed over an area. From at least one of these transceivers the call signals are transmitted to the mobile subscriber. This avoids annoying changes in delay in modulation offering trunks which are now no longer required between the call center and the transceivers as well as interference produced by such changes in delay in the simultaneous reception by two adjacent transceivers. All transceivers can therefore operate at the same carrier frequency and simultaneously.

12 Claims, 2 Drawing Figures

4,672,655

METHOD FOR ESTABLISHING A CONNECTION WITH A MOBILE SUBSCRIBER AND SYSTEM FOR IMPLEMENTING THE METHOD

BACKGROUND OF THE INVENTION

The present invention relates to a method for establishing a connection between a stationary subscriber connected to a telephone system and a mobile subscriber equipped with a radio receiver, wherein the stationary subscriber dials a call center connected with the telephone system and supplies the subscriber number of the desired mobile subscriber, the call center relays the desired subscriber number to a ground radio station from where it is directionally transmitted to a satellite which retransmits the desired subscriber number to the ground, and finally the radio receiver of the desired mobile subscriber, after receiving its own subscriber number, emits an alarm signal to the mobile subscriber. The present invention also relates to a system for implementing the above method.

A method of the above type is described in an article by R. E. Anderson et al, entitled, "Satellite Aided Mobile Telephone System", PROCEEDINGS OF THE NATIONAL ELECTRONIC CONFERENCE, Volume 33, October 29-31, 1979, pages 432-437, and in particular on page 435, left-hand column, to right-hand column, line 3. This article proposes to have the mobile radio receiver receive the call intended for it, i.e. its subscriber number, directly from a satellite, which retransmits it covering an entire area. With regard to exchange engineering, this is the simplest solution. However, this solution requires high expenditures for the radio receivers and/or the satellite. That is, the radio receivers must be equipped with highly sensitive antennas suitable for satellite reception and with input amplifiers, and/or the satellite must have a high transmitting power. If the radio receivers are portable pocket call receivers, such requirements are difficult to meet.

SUMMARY OF THE INVENTION

It is therefore the object of the present invention, to develop a method which operates with less radio engineering expense for the radio receivers (preferably pagers).

The above object is achieved according to the invention by a method for establishing a connection between a stationary subscriber connected to a telephone system and a mobile subscriber equipped with a radio receiver, wherein the stationary subscriber dials a call center connected with the telephone system, giving the subscriber number of the desired mobile subscriber, the call center relays the desired subscriber number to a ground radio station from where it is directionally transmitted to a satellite, the satellite retransmits the desired subscriber number to the ground, and the radio receiver of the desired mobile subscriber, after receiving its own subscriber number, emits an alarm signal to the mobile subscriber; and wherein a plurality of stationary transceivers are distributed over the terrestrial area covered by the signal transmitted by the satellite, with the transceivers receiving and then retransmitting the desired subscriber number, and the radio receiver of the desired mobile subscriber receives the signal containing its subscriber number from one of the stationary transceivers.

In this method, the radio receivers receive the calls intended for them, including their subscriber number, not directly from the satellite, but from one of a plurality of regional transceivers which are distributed over the area on the ground covered by the satellite and which retransmit the desired subscriber numbers (call signals).

The stationary subscriber can determine which stationary transceiver(s) actually retransmits the subscriber number received from the satellite to the radio receiver, in that the stationary subscriber dials, in addition to the desired subscriber number, a number which indicates by which stationary transceiver(s) the desired subscriber number is to be broadcast.

The above object is further achieved, according to the invention, by a system for establishing a connection between a stationary subscriber location connected to a telephone system and a desired one of a plurality of mobile subscribers which comprises: a mobile radio receiver for each mobile subscriber with each the mobile radio receiver including an alarm signal generator means, which is responsive to its own subscriber signal number, for emitting an alarm signal; a stationary telephone system including at least one call center, which is connected with a ground radio system, for the transfer of calls; means, at the stationary subscriber station, for supplying the subscriber call signal number of a desired mobile subscriber to the call center via the telephone system; relay satellite means for receiving call signals transmitted by the ground radio system and for retransmitting the received call signals over a covered terrestrial area; and a plurality of transceiver means, distributed over the area covered by the transmitted signal from the satellite means, for receiving the call signals transmitted by the satellite means and for retransmitting same to the mobile radio receivers, whereby the mobile radio receivers receive the call signals from the satellite means only indirectly via the transceiver means.

As already known from radio systems for personnel paging in cities or for state-wide paging systems, it is possible, via the satellite and the intermediately provided stationary transceivers, to transmit to the radio receiver of the mobile subscriber, in addition to its own subscriber number, at least one further signal, for example, the subscriber number of the calling, stationary subscriber (for optical display in the mobile radio receiver) or also a voice transmission.

It is further possible to utilize the method according to the invention in conjunction with the method disclosed in European Patent Application No. 83,110,314 filed Oct. 15, 1983, corresponding to U.S. application Ser. No. 660,482, filed Oct. 11, 1984 (the subject matter of which is incorporated herein by reference). In this way it is accomplished that, although a telephone connection between a stationary telephone system and a mobile subscriber is established via a satellite and a transceiver, the telephone call itself takes place over the telephone system and a radio connection established between the mobile subscriber and a radio transfer exchange of the telephone system.

With the method according to the present invention it is possible to circumvent system specific difficulties which occur in the prior art, statewide, terrestrial call or paging systems. Such radio call systems on a statewise basis require several hundred transmitters and an extensive cable network for their modulation offering trunks. In order to prevent interference by time offset modulation signals in a common channel radio system operated with a plurality of transmitters, it is necessary to compensate for differences in delay. For this purpose, all lines of the cable system leading to simultaneously transmitting transmitters must be matched to the greatest delay occurring in a line of the system. Nevertheless, malfunctions continue to occur during operation of such a system because the line sections do not exhibit sufficiently constant delay behavior or uncontrollable switching occurs in the distribution stations. Alternatively, if instead of a cable network, radio links are employed due to the larger distances involved, delay equalization is likewise difficult to accomplished since the active converters employed for this purpose exhibit different and insufficiently time constant delay behavior. For this reason, it has been desired in the past to, if possible, limit simultaneous broadcasting systems to short ranges if possible, where low frequency cables or coil-loaded circuits are still able to bridge the desired distance range. In that case, the area to be supplied must be subdivided into several regions which are each supplied in simultaneous broadcasting operation. To avoid time differences in modulation signals originating from different simultaneous broadcasting systems in the overlap regions of different areas, adjacent simultaneous broadcasting systems must transmit in a time slot method. For example, three time slots may be provided so that the transmitters from different simultaneous broadcasting networks (i.e. from different areas) cannot overlap one another in time. If only one radio frequency is available for the various regions, the use of the time slot method reduces the number of possible telephone subscribers to 33% of the number which would be possible if all regions could transmit continuously.

Such system limitations can be substantially avoided by the present invention in that the modulation signals are conducted to the transceivers via a satellite to ground transmission path. The call center conducts the call signals coming from the public telephone system to the satellite via one or a plurality of ground stations.

The call signals are transmitted to the ground via an antenna which covers, for example, the entire Federal Republic of Germany, and are received by the transceivers which may be disposed, for example, in individual call centers. These transceivers convert the received call signals to the base band and use the base band signal to modulate the transmitter of the transceiver which then sends out the call signals.

If no voice transmission is intended, a permanently switched telephone channel is required for the transmission of the call signals via the satellite, permitting up to $10^6$ radio subscribers to be connected at a bit rate of 1024 bit/s, it being assumed that for each call signal a total of 20 characters (corresponding to the subscriber number to be called and the subscriber number of the stationary subscriber) are to be transmitted.

The radio connection between satellite and ground has a constant delay of 125 ms and is of almost identical size for all transceivers in an area of the size of the Federal Republic of Germany. The difference in delay to adjacent regions is small compared to the permissible time difference of 240 ms which must be maintained in order to avoid interference from time offset modulation signals.

If a maximum of 50 km is assumed to exist for the distance between transceivers whose transmitters supply their own assigned region, a delay difference of 17 ms results for the modulation signals of adjacent transmitters. The greater difference in delay between the north and the south of Germany is insignificant if a subdivision is made into smaller regions, particularly local areas so that at least one region (or local area) will lie between them and thus there will be no overlap between transmissions from a region in northern Germany and one in southern Germany. The differences in delay between transmitters of adjacent regions thus always remains in a negligible order of magnitude. Special delay equalization for the modulation signals conducted over the satellite is not necessary. Additionally, transmissions can occur simultaneously and with one and the same carrier frequency over the entire area (Federal Republic of Germany) so that no time slots are required which would reduce call handling capacity.

The present invention will now be described in greater detail with the aid of the drawings.

DETAILED DESCRIPTION OF THE PREFERRED EMBODIMENT

Figure 1:
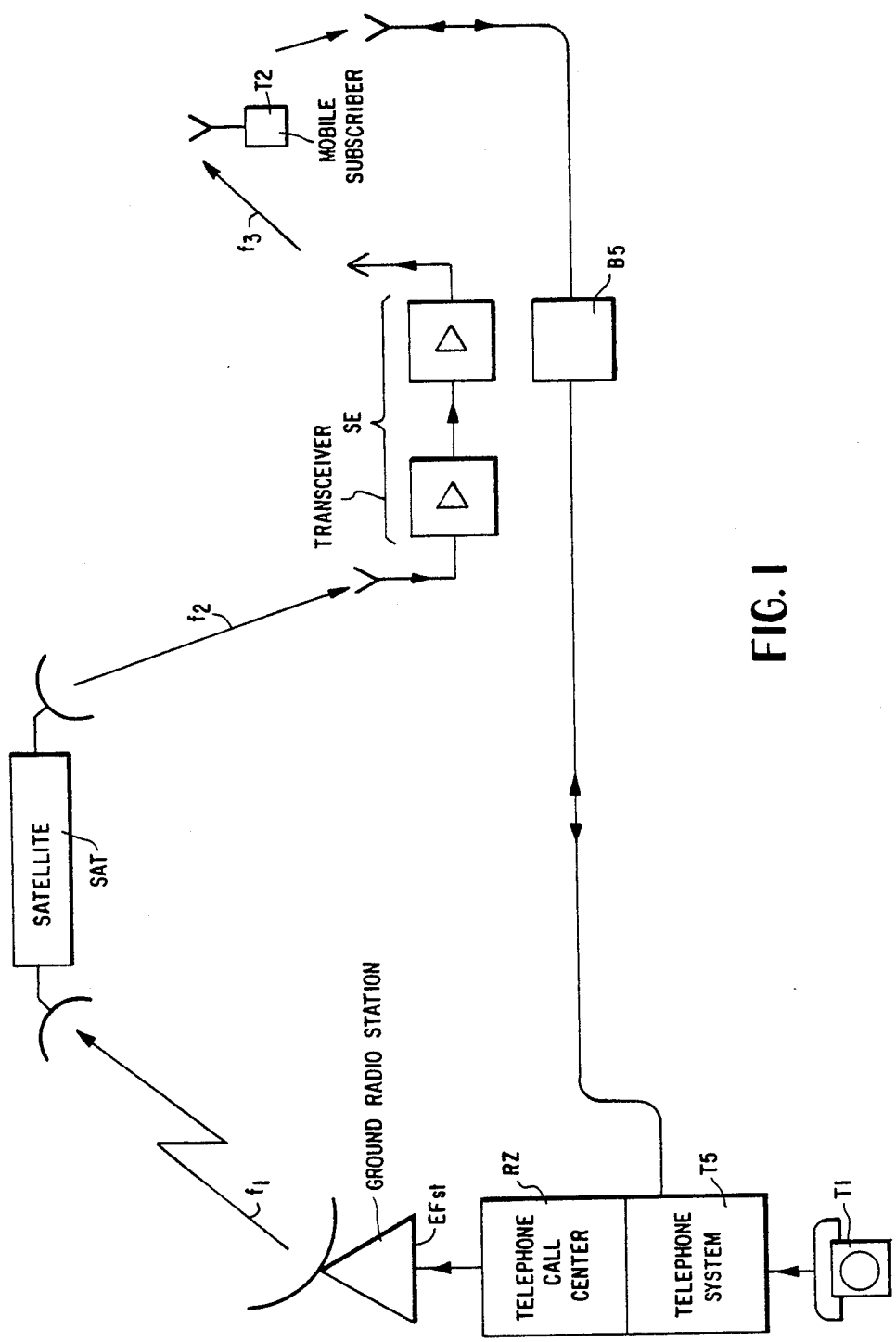
FIG. 1 is a block circuit arrangement illustrating a scheme for the arrangement of the basic system according to the invention for carrying out the method according to the invention.

As indicated above, according to the present invention, the mobile subscriber, which is supplied with a radio receiver (and possibly a mobile telephone) which reacts to receipt of its own call signal by emitting at least an alarm signal, does not communication directly with the satellite but rather via a transceiver. The basic system for this communication link is shown in FIG. 1 wherein the call receiver is shown in the form of mobile subscriber T2. To call this subscriber T2, a telephone stationary subscriber T1 dials the subscriber number of the desired mobile subscriber T2, possibly together with information to be conveyed (for example the telephone number of the stationary subscriber T1) and possibly also a code number for the region or the local area in which the mobile subscriber T2 is to be found. All these signals are transmitted via a telephone system TS to a call center RZ, and from there to a ground radio station EFSt which transmits the signals, with a carrier at frequency $f_1$, to a satellite SAT. The satellite SAT, which may serve merely as relay station, retransmits the signals to cover the entire region of at least one local area with the aid of a carrier frequency $f_2$. As further indicated above, disposed in the area covered by the satellite SAT (e.g. FIG. 2) are a plurality of transceivers SE, only one of which is shown in FIG. 1. Preferably, all of the transceivers SE of the area covered by satellite SAT (see FIG. 2) receive these signals and at least one of transceivers SE retransmits the received signals wirelessly at a carrier frequency $f_3$ to the mobile subscriber T2 located in the supply area of transceiver SE.

If the method according to the invention is utilized only to establish a telephone connection via a satellite and a transceiver, while the telephone call itself takes place over the telephone system and a radio connection, the telephone connection will be established as follows:

The stationary subscriber T1 initially dials the number of the call center (radio transfer exchange) RZ with which the desired mobile subscriber T2 is registered and then he dials the number of the desired mobile subscriber. As soon as a connection has been established between the stationary subscriber and the dialed call center RZ, a request is sent to the statinary terminal T1 to indicate the number to be called by the mobile subscriber terminal T2. Generally this will be the number of the calling stationary subscriber terminal itself or the number of another subscriber terminal. Once the number has been received by the call center RZ, the calling stationary subscriber T1 is requested to hang up his telephone and wait for a call-back from the desired mobile subscriber T2.

If the transmit/receive device of the desired mobile subscriber terminal T2 identifies its own number in the search requests broadcast by the satellite, it stores the number of the subscriber terminal to be called, which follows the own number of terminal T2. After receiving the numbers, the transmit/receive device of mobile subscriber terminal T2 automatically transmits T1 the number of the subscriber terminal to be called back to that of several base radio stations BS which offers the best receiving level in the closest call center RZ. The mobile subscriber terminal T2 continues to be connected with this call center, which finally establishes the connection applicable to the number of the desired stationary subscriber terminal in the telephone system, even after the mobile subscriber terminal moves into the receiving range of another call center. If a plurality of call centers participate in the establishment of such a radio connection, the necessary interchange of data among these call centers can take place via a multiplexing device or even via the satellite SAT.

Figure 2:
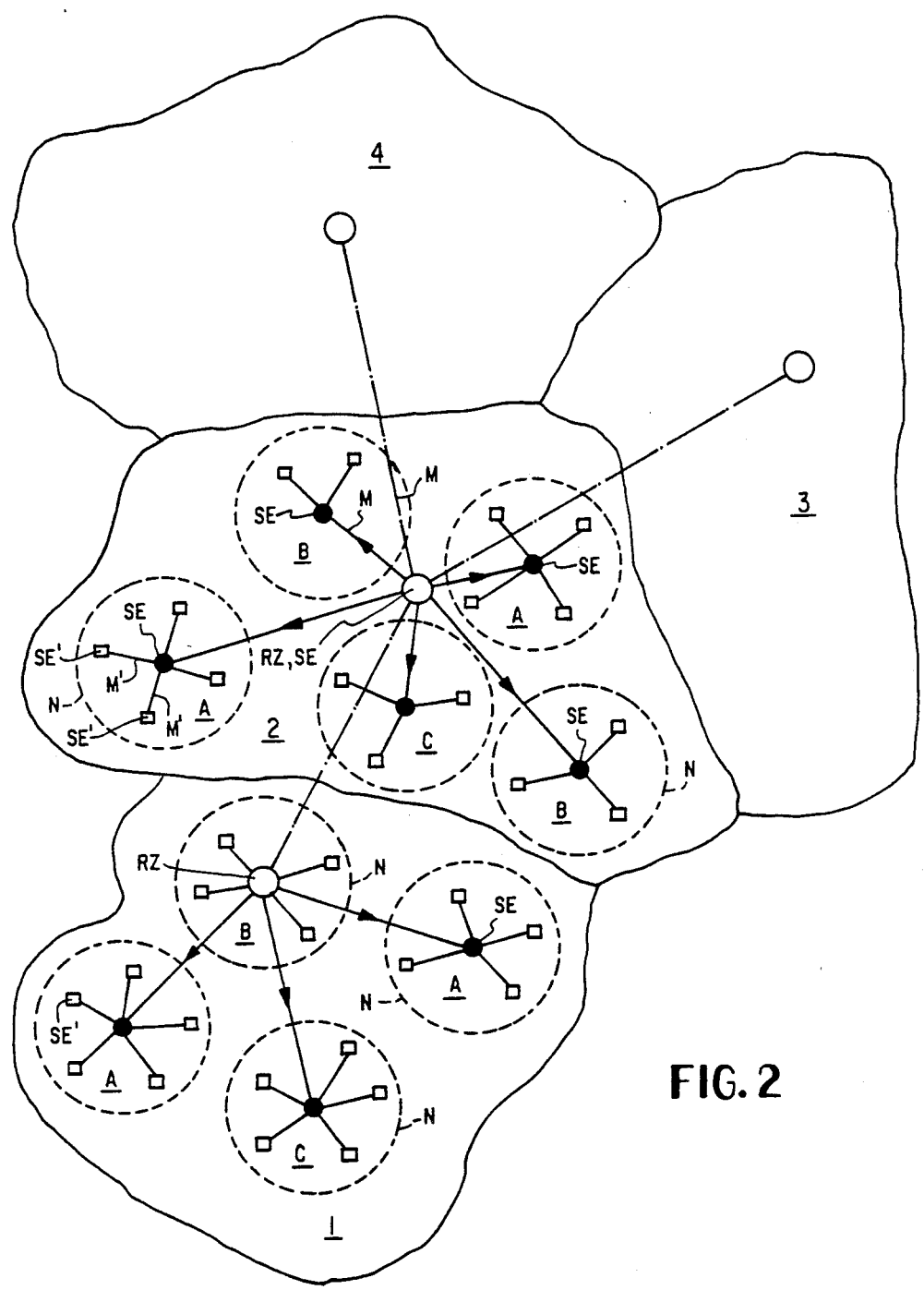
FIG. 2 schematically shows the subdivisions of an area covered by a satellite according to the method of the invention and schematically illustrates the location of the transceivers and telephone call centers.

Turning now to FIG. 2, in the area shown the transceivers SE are located at the locations likewise marked SE, i.e. approximately in the center of each local area N. The locations of telephone call centers RZ are likewise marked RZ. Additionally, FIG. 2 shows the division into large regions 1 through 4 advisable in such a call system, for example in order to combine a plurality of such local areas N to which a call is to be limited. In the past, the call signals in such a system had to be supplied through the illustrated modulation offering trunks M and, to avoid interference in the marginal regions of the local area, transmissions had to take place in a time slot method in such a manner that of three immediately adjacent local areas A, B, C alternatingly only one local area was transmitting at any one time. The present invention now permits the elimination of these modulation offering trunks M and transceivers Se in all local areas A, B, C can transmit continuously and simultaneously, preferably at the same carrier frequency $f_3$ (i.e. in simultaneous broadcasting operation) and, if required, they may all transmit the same call signal since interference as a result of delay deviations in modulation offering trunks M is no longer encountered.

If the transceivers are used (exclusively or additionally) at locations SE' (in which case the transmitters of these transceivers SE' of a respective local area N also operate in a simultaneous broadcasting system) otherwise possibly required local area modulation offering trunks M' can be omitted.

A system which can be used to carry out the method of the invention (without the ground radio station or stations, the satellite, and the plurality of transceivers) including a mobile radio receiver which emit s an alarm signal upon receipt of its call signal and which has a display for the calling subscriber number (according to German Pat. No. 1,184,253) is described in the journal "nachrichten elektronik+telematik", Vol. 37, number 2, February, 1983, pages 48 to 54.

It will be understood that the above description of the present invention is susceptible to various modifications, changes and adaptations, and the same are intended to be comprehended within the meaning and range of equivalents of the appended claims.

What is claimed is:

1. In a method for establishing a connection between a stationary subscriber connected to a telephone system and a mobile subscriber equipped with a radio receiver, wherein said stationary subscriber dials a call center connected with the telephone system, giving the subscriber number of the desired mobile subscriber, said call center relays the desired subscriber number to a ground radio station from where it is directionally transmitted to a satellite, said satellite retransmits the desired subscriber number to the ground, and the radio receiver of the desired mobile subscriber, after receiving its own subscriber number, emits an alarm signal to the mobile subscriber; the improvement comprising: providing a plurality of stationary transceivers distributed over the terrestrial area covered by the signal transmitted by the satellite, with said transceivers receiving and then retransmitting said desired subscriber number; and wherein the radio receiver of the desired mobile subscriber receives the signal containing its subscriber number from one of said stationary transceivers.

2. The method as defined in claim 1 wherein: said stationary subscriber also supplies its own subscriber number to said call center; and further comprising: transmitting said subscriber number of said stationary subscriber, together with said desired subscriber number, via the ground radio station, the satellite and the plurality of transceivers; and, displaying said subscriber number of the calling said stationary subscriber in the radio receiver of the desired said mobile subscriber.

3. A method as defined in claim 2 wherein said desired mobile subscriber has a mobile telephone; and further comprising establishing a telephone connection between the desired said mobile telephone subscriber and said stationary calling subscriber by using the received said subscriber number of said stationary subscriber at said desired mobile subscriber to establish a telephone connection between said desired mobile subscriber and said telephone system over a separate terrestrial radio connection.

4. A method as defined in claim 3 wherein, said satellite transmits its signal to all of said transceivers located in the area covered by the satellite at one and the same carrier frequency.

5. A method as defined in claim 4, wherein at least three of said transceivers, each supplying mutually adjacent local areas, transmit by simultaneous broadcasting.

6. A method as defined in claim 5 wherein said at least three of said transceivers transmit at the same carrier frequency which is different than said carrier frequency of the satellite.

7. A method as defined in claim 1 wherein, said satellite transmits its signal to all of said transceivers located in the area covered by the satellite at one and the same carrier frequency.

8. A method as defined in claim 7, wherein at least three of said transceivers, each supplying mutually adjacent local areas, transmit by simultaneous broadcasting.

9. A method as defined in claim 8 wherein said at least three of said transceivers transmit at the same carrier frequency which is different than said carrier frequency of the satellite.

10. A system for establishing a connection between a stationary subscriber location connected to a telephone system and a desired one of a plurality of mobile subscribers comprising in combination:
  a mobile radio receiver for each mobile subscriber, with each said mobile radio receiver including an alarm signal generator means which is responsive to its own subscriber signal number for emitting an output signal;
  a stationary telephone system including at least one call center, which is connected with a ground radio system, for the transfer of calls;
  means, at said stationary subscriber station, for supplying the subscriber call signal number of a desired mobile subscriber to said call center via said telephone system;
  relay satellite means for receiving call signals transmitted by said ground radio system and for retransmitting the received call signals over a covered terrestrial area; and
  a plurality of transceiver means, distributed over said area covered by the transmitted signal from said satellite means, for receiving the call signals transmitted by said satellite means and for retransmitting same to said mobile radio receivers, whereby said mobile radio receivers receive said call signals from said satellite means only indirectly via said transceiver means.

11. A system as defined in claim 9 wherein at least three of said transceiver means are provided, each transmitting at the same carrier frequency.

12. A system as defined in claim 10 wherein said satellite means transmits at the same carrier frequency to all of said transceiver means, with said carrier frequency of said satellite means being different than said carrier frequency of the transmitted signals from said transceiver means.

* * * * *